(12) United States Patent
Sternberg et al.

(10) Patent No.: US 7,582,017 B2
(45) Date of Patent: Sep. 1, 2009

(54) CONTROL DEVICE MADE OF IMPACT RESISTANT MATERIAL

(76) Inventors: Aaron B. Sternberg, 14000 NW. 29th Ave., Vancouver, WA (US) 98685; Michael R. Borer, 655-74 Dundas, Dundas, Ontario (CA) L9H 6Y6

( * ) Notice: Subject to any disclaimer, the term of this patent is extended or adjusted under 35 U.S.C. 154(b) by 288 days.

(21) Appl. No.: 11/587,503

(22) PCT Filed: Aug. 19, 2005

(86) PCT No.: PCT/US2005/029587

§ 371 (c)(1),
(2), (4) Date: Oct. 25, 2006

(87) PCT Pub. No.: WO2006/023746

PCT Pub. Date: Mar. 2, 2006

(65) Prior Publication Data

US 2008/0032795 A1    Feb. 7, 2008

Related U.S. Application Data (60) Provisional application No. 60/603,349, filed on Aug. 20, 2004.

(51) Int. Cl.
*G06F 17/00* (2006.01)
(52) U.S. Cl. ...................................................... 463/36
(58) Field of Classification Search .............. 463/36–38
See application file for complete search history.

(56) References Cited

U.S. PATENT DOCUMENTS

| | | | | |
|---|---|---|---|---|
| 4,762,227 | A * | 8/1988 | Patterson .................... | 206/320 |
| 4,769,517 | A | 9/1988 | Swinney ..................... | 200/6 A |
| 4,824,059 | A | 4/1989 | Butler ........................ | 248/176 |
| 4,925,149 | A | 5/1990 | DiFrancesca et al. | |
| 5,181,024 | A | 1/1993 | Tsunoda et al. | |
| 5,648,757 | A * | 7/1997 | Vernace et al. ......... | 340/539.32 |
| 5,680,796 | A | 10/1997 | Wüstenberg et al. | |
| 5,741,182 | A | 4/1998 | Lipps et al. ................... | 463/36 |
| 5,880,418 | A * | 3/1999 | Livesay ...................... | 200/5 A |
| 6,110,073 | A * | 8/2000 | Saur et al. ..................... | 482/8 |
| 6,259,433 | B1 * | 7/2001 | Meyers ....................... | 345/161 |
| 6,267,770 | B1 | 7/2001 | Truwit | |
| 6,710,766 | B1 * | 3/2004 | Ogata ......................... | 345/156 |
| 6,744,421 | B2 | 6/2004 | Lilenfeld .................... | 345/157 |
| 7,167,159 | B2 * | 1/2007 | Bailey ........................ | 345/161 |
| 2001/0055462 | A1 | 12/2001 | Seibel | |
| 2002/0065134 | A1 * | 5/2002 | Ogata et al. .................. | 463/37 |
| 2002/0125112 | A1 | 9/2002 | Takezawa | |

(Continued)

OTHER PUBLICATIONS

Supplementary European Search Report and search opinion, European Patent Application No. EP 05 78 8831, dated Sep. 5, 2007, 7 pages.

(Continued)

*Primary Examiner*—Ronald Laneau
(74) *Attorney, Agent, or Firm*—Stoel Rives LLP (57) ABSTRACT

A manual controller (10) for manipulating images or symbols on a display is made of impact resistant material such as dense foam rubber to resist damage resulting from accidental or intentional impact caused by throwing, dropping, or other insult. Damage resistance entails maintaining the operational integrity of the electronics and the structural integrity of the manual controller.

24 Claims, 10 Drawing Sheets

U.S. PATENT DOCUMENTS

2002/0180148 A1    12/2002  Koziel ................... 273/148 B
2003/0127345 A1*    7/2003  Zuleta et al. ............... 206/320
2003/0137338 A1     7/2003  Hisatsune et al.
2006/0258458 A1*   11/2006  Addington et al. ............ 463/36

OTHER PUBLICATIONS

International Search Report and Written Opinion, International Patent Application No. PCT/US05/29587, dated Jul. 31, 2006, 6 pages.

* cited by examiner

CONTROL DEVICE MADE OF IMPACT RESISTANT MATERIAL

RELATED APPLICATIONS

This application is a 371 of International Application No. PCT/US05/29587, filed Aug. 19, 2005, which claims benefit of U.S. Provisional Patent Application No. 60/603,349, filed Aug. 20, 2004.

TECHNICAL FIELD

This invention relates to a manual controller for manipulating images or symbols on a visual display and, in particular, to such a controller having a housing made of impact resistant material that resists damage resulting from accidental or intentional impact.

BACKGROUND INFORMATION

Manual controllers for manipulating images or symbols on a visual display of a computing device include, for example, joysticks, game pads, steering wheels, guns, and mice for video games; remote devices for television, DVD, VCR, stereophonic equipment, projectors, and other such electronic equipment; cellular telephones; and portable video game systems. Conventional housings for such manual controllers are typically made of hard plastic material that fails to maintain the structural integrity of the controller or the operational integrity of its electronics undergoing impact applied by accident or a user experiencing a moment of extreme frustration or unrestrained exuberance. Video game players are especially susceptible to intentionally inflicting damaging impact on a manual controller by throwing, dropping, or delivering other insult to it.

SUMMARY OF THE INVENTION

A damage resistant manual controller for manipulating images or symbols on a display comprises a foam rubber exoskeleton having an interior region configured to confine an internal electronics assembly that is operatively connected to control actuators. The internal electronics assembly includes electrical components that cooperate with the control actuators to produce signals for manipulating images or symbols on the display. The control actuators are positioned for direct or indirect tactile manipulation by a user to cause production of the signals.

Additional aspects and advantages will be apparent from the following detailed description of preferred embodiments, which proceeds with reference to the accompanying drawings.

BRIEF DESCRIPTION OF THE DRAWINGS

FIGS. 7B-1 and 7B-2 show a flexible printed circuit board on a substrate in respective unflexed and flexed states.

DETAILED DESCRIPTION OF PREFERRED EMBODIMENTS

Figure 1:
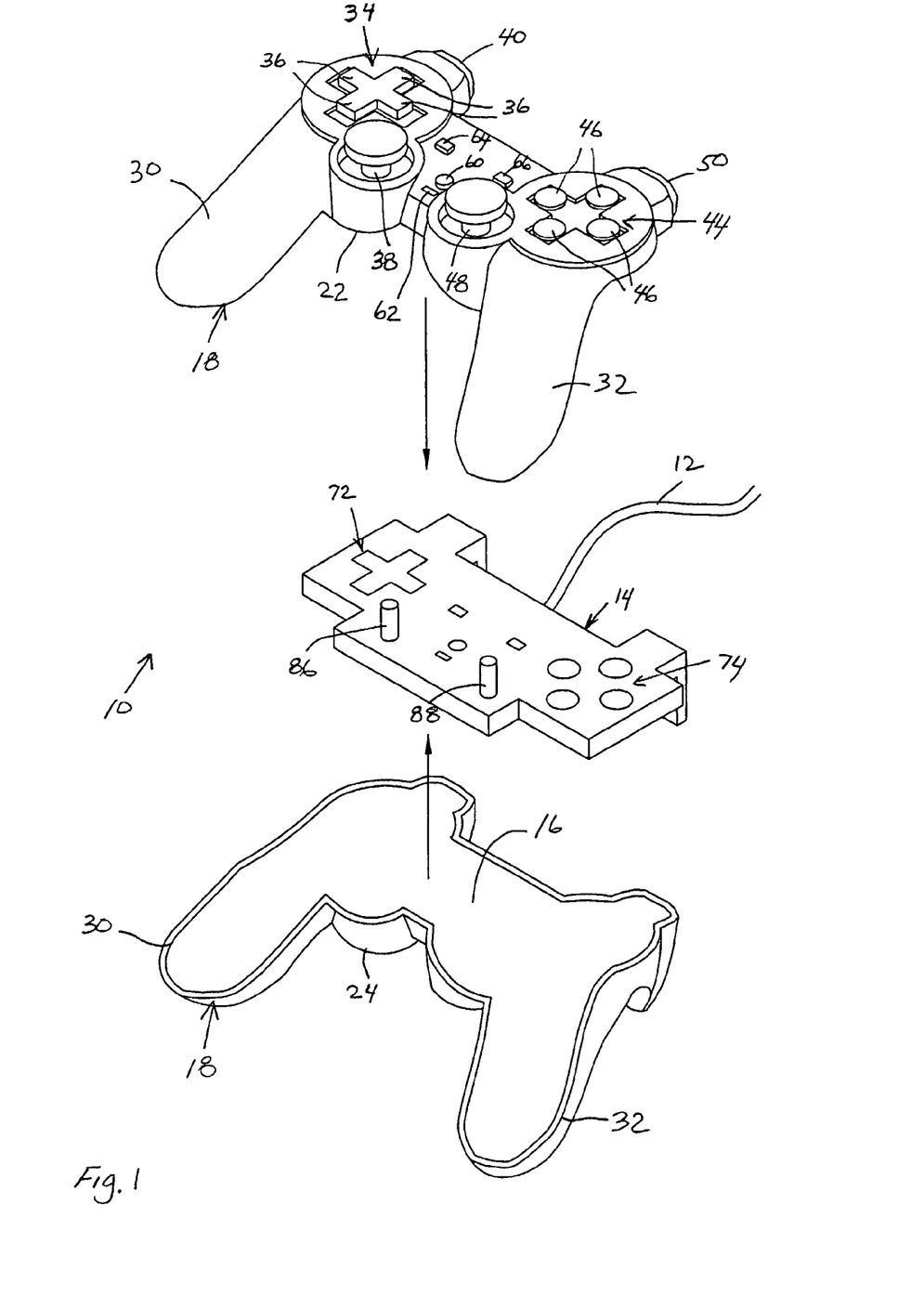
FIGS. 1, 2, and 3 are exploded views of respective first, second, and third preferred embodiments of an impact resistant manual controller.

FIG. 1 is an exploded view of a first preferred embodiment of a manual controller 10 that is detachably connected by a cable 12 to a computing device (not shown) for manipulating images or symbols on a display associated with the computing device. Although this embodiment is equipped with cable 12, manual controller 10 may also operate with a computing device through a wireless communication link. Manual controller 10 includes an internal electronics assembly 14 housed within an interior region 16 of an exoskeleton 18 formed of foam rubber. The foam rubber material is preferably medium-to-high density polyurethane exhibiting flexibility properties, such as those of the foam rubber used in NERF toy products. In the first preferred embodiment, manual controller 10 is assembled by placing internal electronics assembly 14 between an upper exoskeleton section 22 and a lower exoskeleton section 24. Upper and lower exoskeleton sections 22 and 24 are bonded together to form a waterproof, unitary foam rubber casing for internal electronics assembly 14.

As shown in FIG. 1, exoskeleton 18 has a left-hand grip 30 and a right-hand grip 32 for two-handed gripping by a user. A left-side control pad 34 including four pressable control members 36, left-side analog stick control 38, and front left-side control button 60 are positioned for access by digits of the user's left hand; and a right-side control pad 44 including four control buttons 46, right-side analog stick control 48, and front right-side control button 50 are positioned for access by digits of the user's right hand. A mode selection switch 60, mode indicator 62, selection button 64, and start button 66 are positioned between hand grips 30 and 32. Skilled persons will appreciate that the above-described number of control actuators, control actuator layout pattern, and hand grip arrangement represent only one of numerous possible control actuator and hand grip configurations.

Figure 4A:
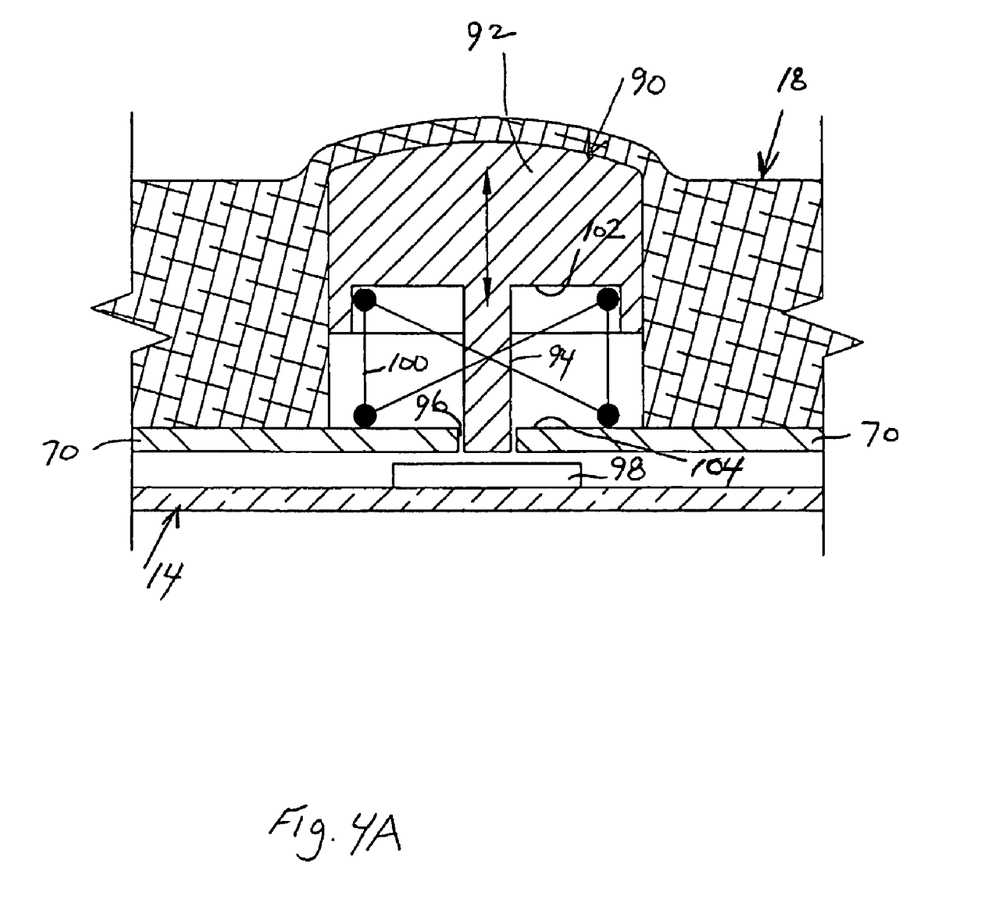
FIG. 4A is a fragmentary cross-sectional view of a control button suitable for use in any one of the preferred embodiments of the manual controller of FIGS. 1-3.

In this embodiment, the total surface area of exoskeleton 18 is covered in foam rubber. The surface areas of these control actuators are perforce covered in foam, thereby rendering them surface control actuators. The control actuator surfaces are preferably made of relatively thin foam rubber, with the button and analog stick control components held in place by a plastic plate 70 (FIGS. 4 and 5) and projecting into recesses in corresponding locations of the control actuator surfaces. Internal electronics assembly 14 includes the actual electronic circuits, controls, and corresponding switch elements, including switch elements 72 and 74 for the respective control pads 34 and 44. Thus, the analog stick controls and buttons are actuated by user manipulation of the foam rubber controls on the surface of exoskeleton 18.

Figure 2:
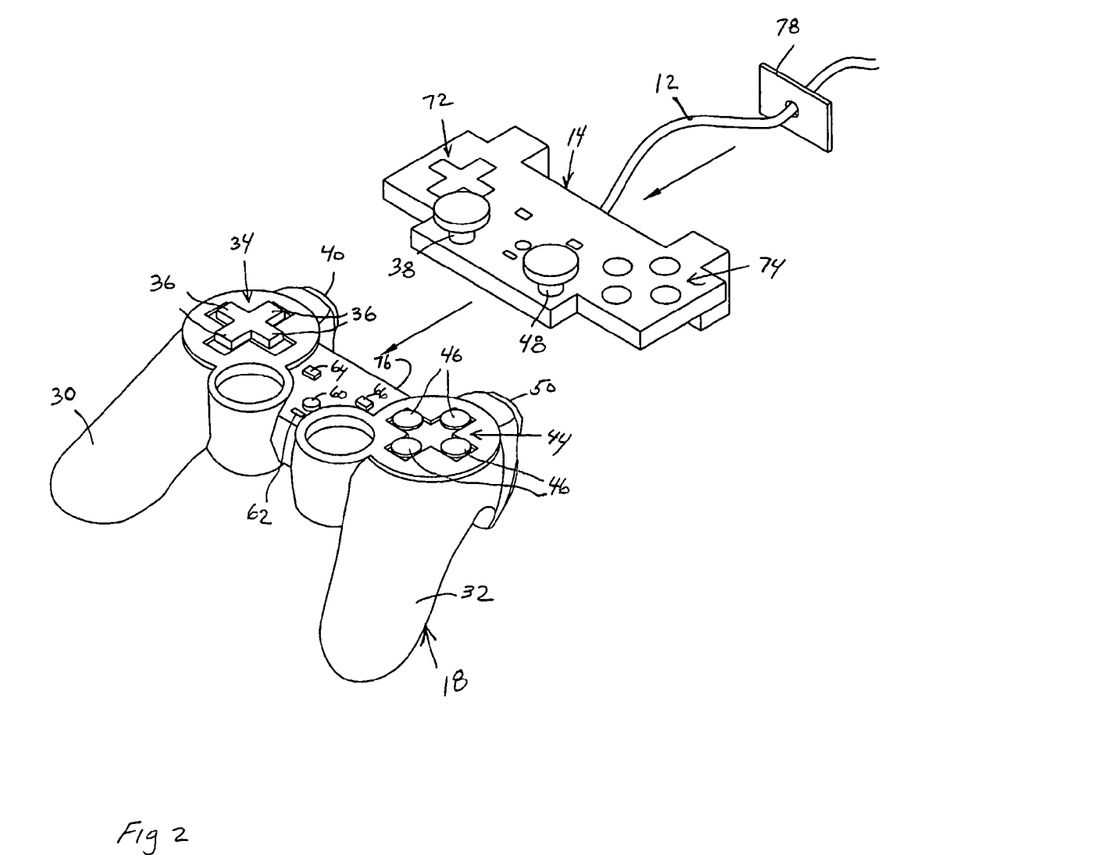
Figure 3:
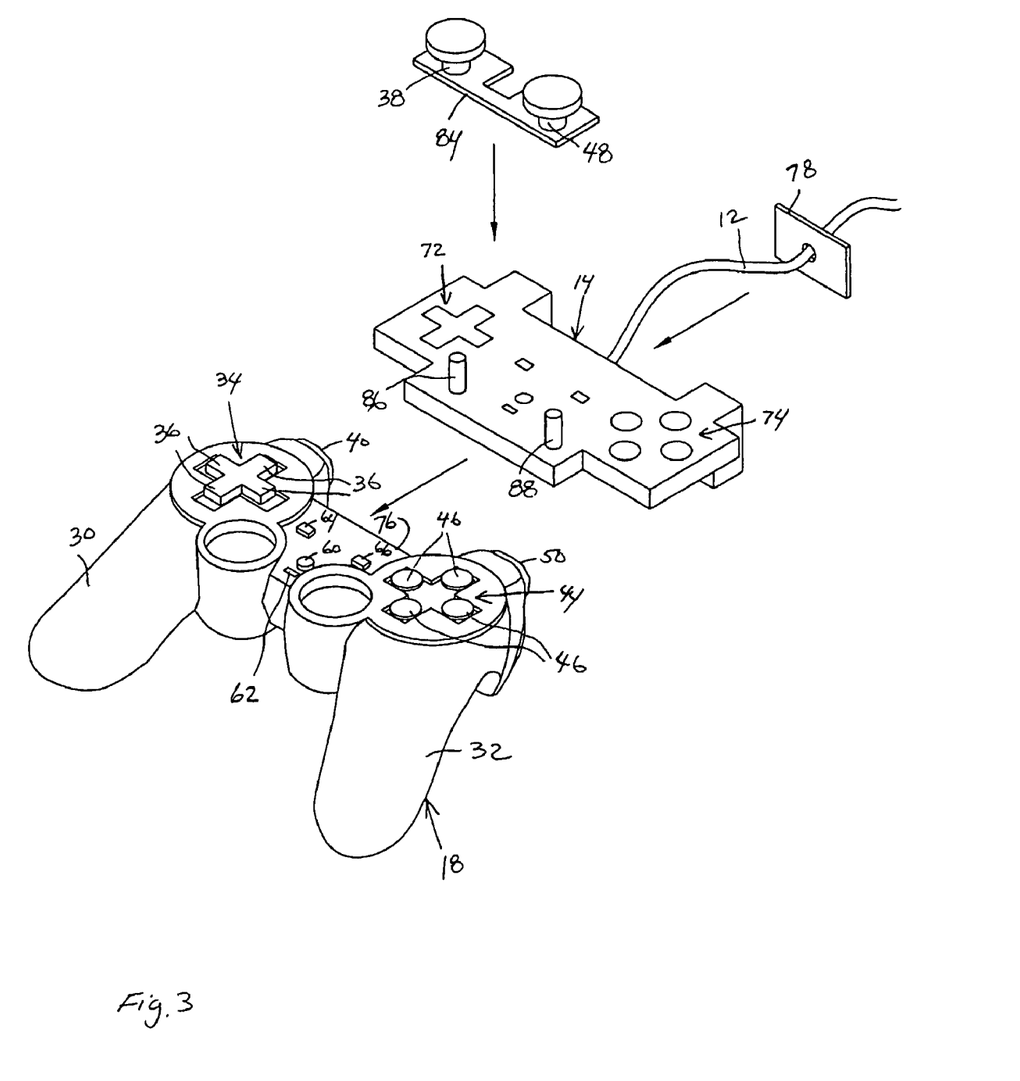

FIGS. 2 and 3 are respective second and third preferred embodiments of manual controller 10, in which foam rubber exoskeleton 18 is formed in one piece. Internal electronics assembly 14 is inserted through an opening 76 in the front side of exoskeleton 18 and force fit into interior region 16, enabled by the elastic properties of the foam rubber material defining its boundaries. Internal electronics assembly 14 is glued in place on its side and bottom surfaces, and a foam rubber plate 78 through which cable 12 passes is glued to cover opening 76. The second and third preferred embodiments exhibit waterproof properties and no seams. The second preferred embodiment shown in FIG. 2 has tall analog stick controls 38 and 48 preinstalled with foam rubber formed to internal electronics assembly 14. The third preferred embodiment shown in FIG. 3 has a separate, shaped foam rubber piece 84 that fits over analog sticks 86 and 88 of the respective analog stick controls 38 and 48 for installation just before assembly of the manual controller.

FIG. 4A shows a control button 90 that is suitable for use as any one of the control buttons described above with reference to FIG. 1. Control button 90 includes a button top portion 92 from which a pin 94 downwardly depends through an aperture 96 in plate 70 to contact a switch contact pad 98 of internal electronics assembly 14. A coil spring 100 positioned between and resting against a bottom surface 102 of button top portion 92 and top surface 104 of plate 70 functions as a biasing mechanism to keep control button 90 elevated at a nominal distance from plate 70 in the absence of user applied contact force. Coil spring 100 causes control button 90 to apply pressure to the region of exoskeleton 18 above it, thereby making control button 90 feel firm to the user.

Figure 4B:
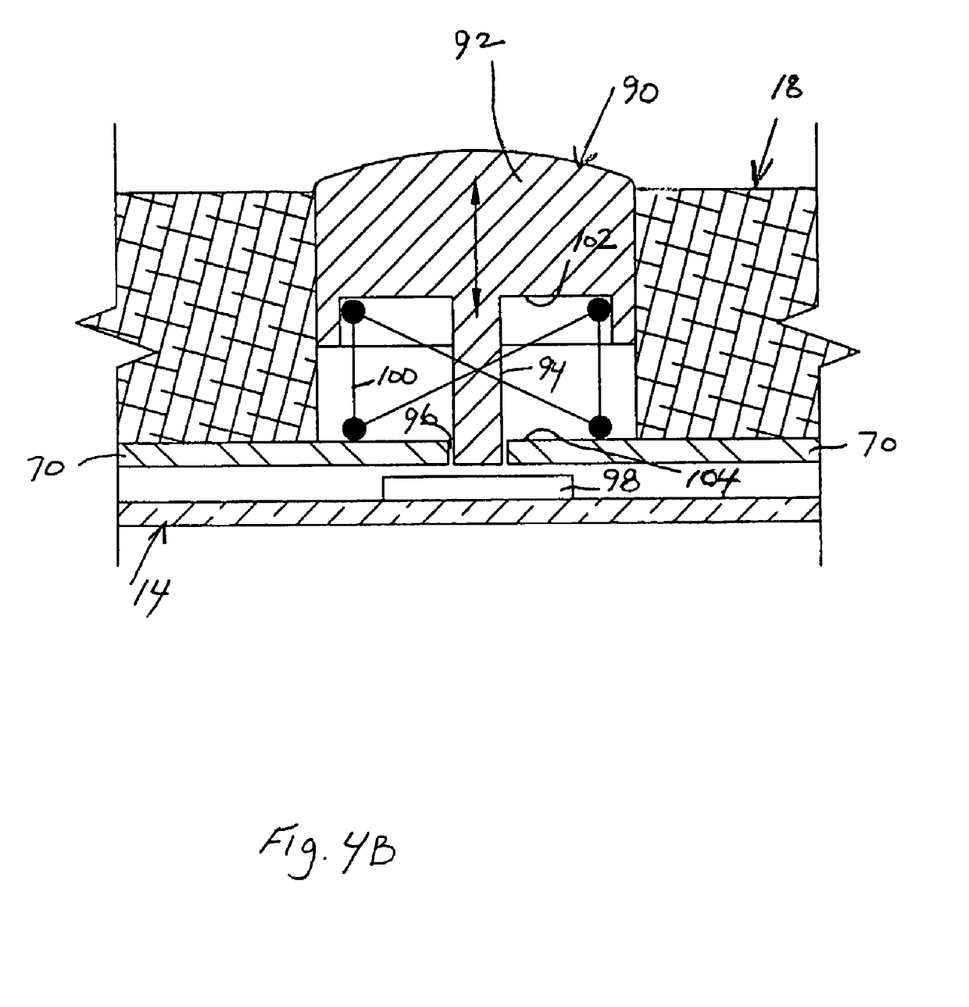
FIG. 4B represents a modification of FIG. 4A in that a region of foam rubber exoskeleton covering a control button is removed to expose a button top portion.

FIG. 4B shows a modification of FIG. 4A in that the region of foam rubber exoskeleton 18 covering control button 90 is removed to expose button top portion 92. Removal of this region of foam rubber can be desirable for certain buttons to increase button reaction time for applications, such as games, requiring buttons exhibiting fast repeat action. Certain buttons for which reaction time is not important, such as a start button, may be covered by foam rubber. Moreover, button top portion 92 may be made of hard plastic or impact resistant material.

Figure 5:
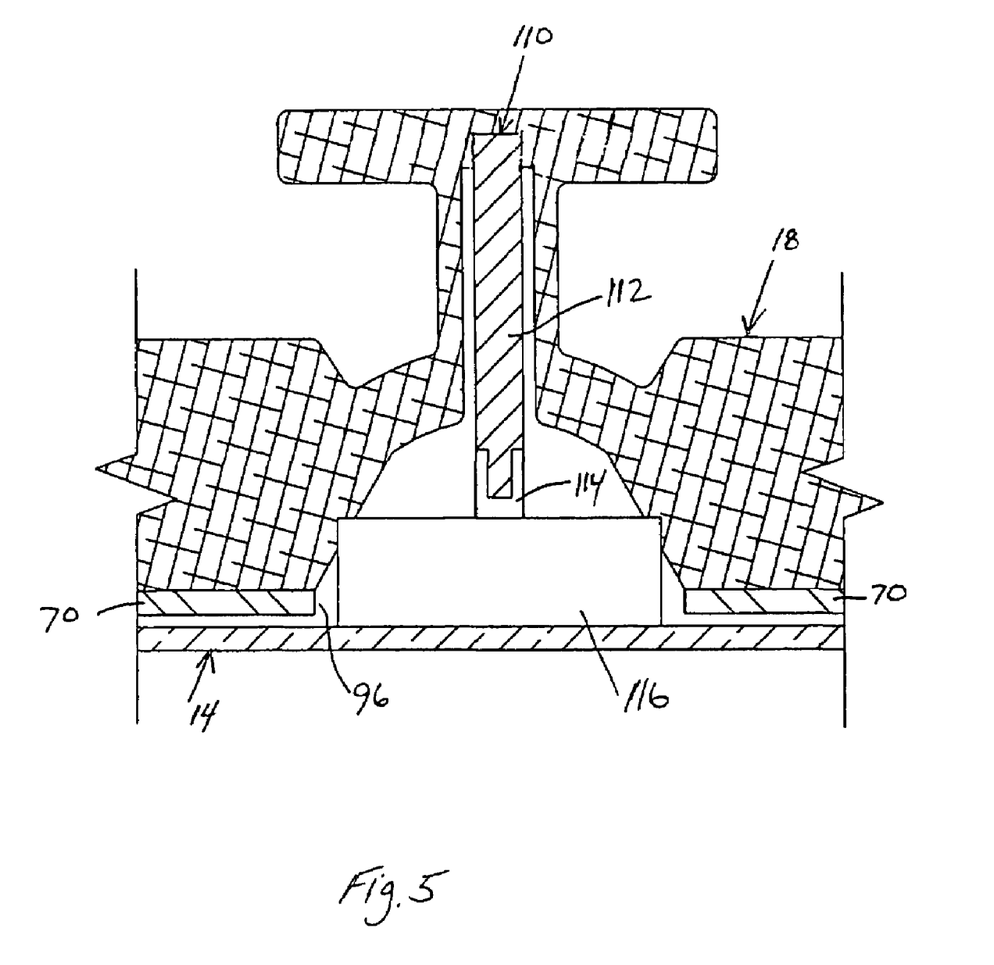
FIG. 5 is a fragmentary cross-sectional view of an analog stick control suitable for use in any one of the preferred embodiments of the manual controller of FIGS. 1-3.

FIG. 5 shows an analog stick control 110 that is suitable for use as one of analog stick controls 38 and 48. A vertical analog stick or pin 112 matably connects with a relatively short analog stick stub 114 projecting upwardly from a raised portion 116 of internal electronics assembly 14. The matable connection can be of conventional plug and socket design secured in place by bonding material, such as glue.

The surface profile of upper exoskeleton section 22 can be envisioned by inverting it and placing all control actuators including control buttons 90 and analog stick controls 110 into recesses that form exoskeleton actuator cavities. Coil springs 100 are positioned at the appropriate places for control buttons 90. A single plate 70 having apertures 96 appropriately located to provide passage of push pins 94 and analog sticks 86 and 88 to corresponding switch elements of internal electronics assembly 14 maintains the placement of the control actuators.

Skilled persons will appreciate that the control actuators can be housed in internal electronics assembly 14, instead of secured in place inside exoskeleton 18. Control actuators not covered by foam rubber would be exposed through corresponding holes in exoskeleton 18.

Figure 6:
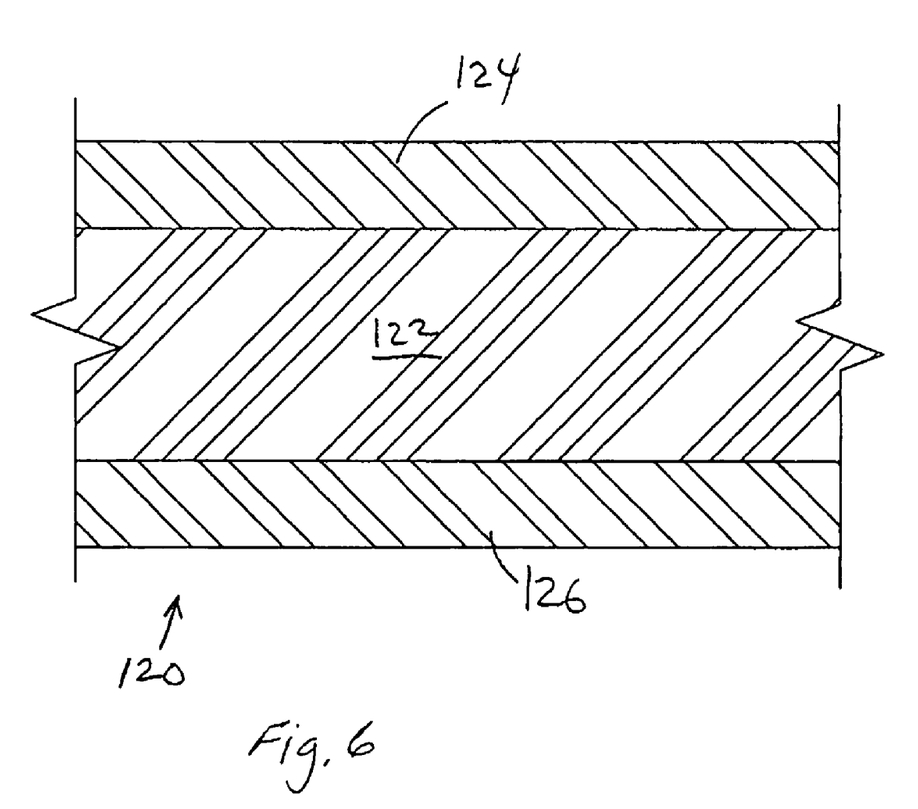
FIG. 6 is a fragmentary cross-sectional view of a foam rubber exoskeleton in the form of a multi-layered structure.

FIG. 6 is a fragmentary cross-sectional view of foam rubber exoskeleton 18 in an alternative form as a multi-layered structure 120, in which an inside core layer 122 separates an upper external layer 124 and a lower external layer 126. Internal electronics assembly 14 fits inside core layer 122. All layers of multi-layered structure 120 are preferably made of foam rubber, with external layers 124 and 126 exhibiting lower density properties than the density property of inside core layer 122 to provide differences in stability and tactility. Alternatively, core layer 122 may be made of material other than foam rubber, such as a very high density polyurethane material.

Figure 7A:
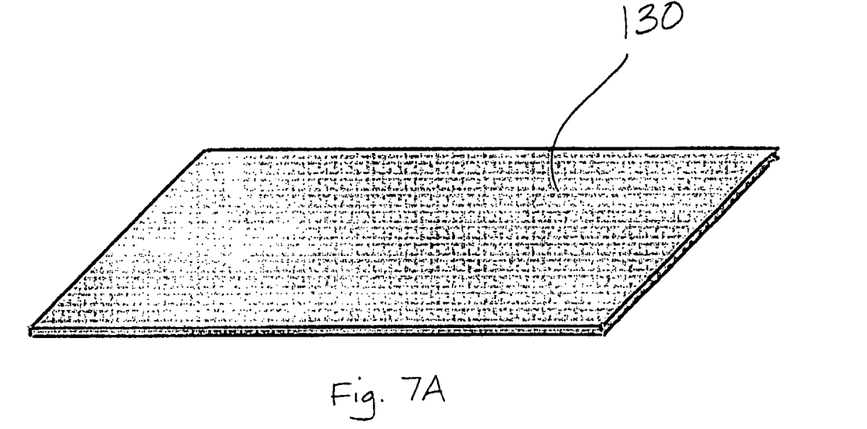
FIG. 7A shows a rigid printed circuit board.
Figure 7B:
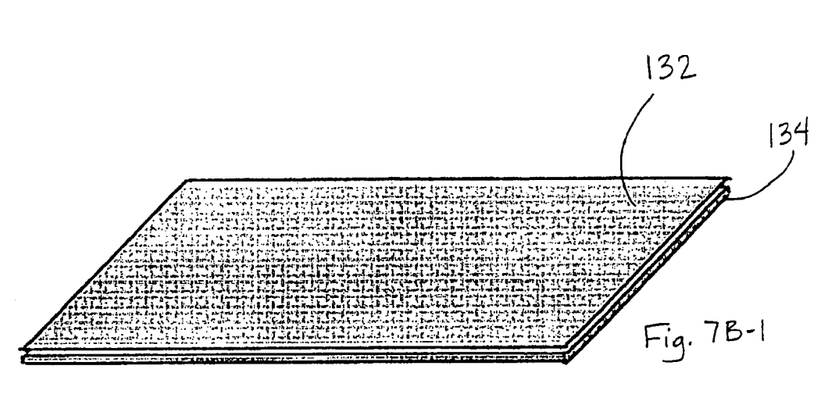
Figure 7B:
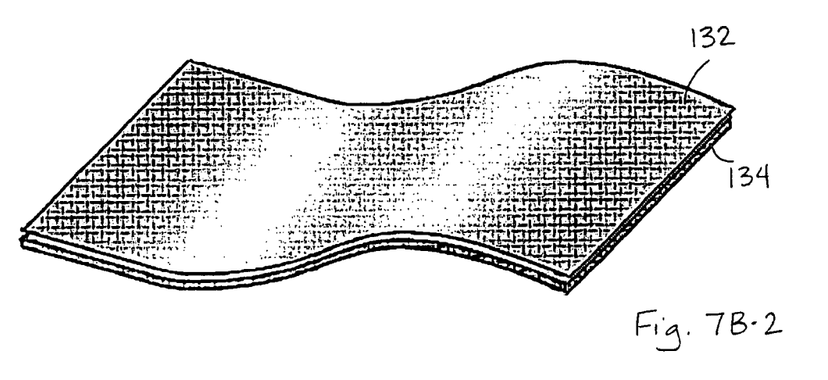
Figure 7C:
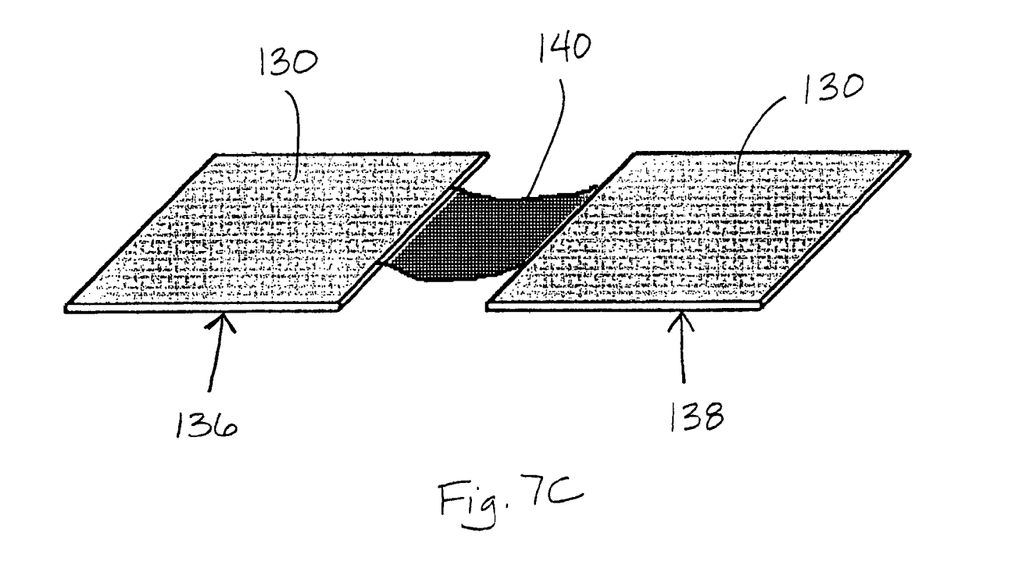
FIG. 7C shows the rigid printed circuit board of FIG. 7A subdivided into separate component parts interconnected by wiring or other communication cabling.

Internal electronics assembly 14 itself is preferably encased in a hard plastic housing and includes a rigid printed circuit board 130, which is shown in FIG. 7A. FIGS. 7B-1 and 7B-2 show flexible printed circuit board 132 supported on a substrate 134 to provide a substitute implementation of internal electronics assembly 14 having sufficient rigidity that enables actuation of the control actuators when manipulated by a user. FIGS. 7B-1 and 7B-2 show printed circuit board 132 and substrate 134 in respective unflexed and flexed states. The electronic circuit components, controls, and switch elements included in internal electronics assembly 14 are mounted on a surface of printed circuit board 132. FIG. 7C shows that rigid printed circuit board 130 can be divided into separate component parts 136 and 138 that are interconnected by wiring or other communication cabling 140. Skilled persons will appreciate that flexible printed circuit board 132 supported on substrate 134 may also be subdivided into component parts and interconnected by cabling.

It will be obvious to those having skill in the art that many changes may be made to the details of the above-described embodiments without departing from the underlying principles of the invention. For example, exoskeleton 18 can be provided with openings to house or display light-emitting diodes, electroluminescent devices, or other forms of internal lighting. The scope of the present invention should, therefore, be determined only by the following claims.

The invention claimed is:

1. A damage resistant hand-gripped manual controller for manipulating images or symbols on a display, the controller having an internal electronics assembly, comprising:
    a foam rubber exoskeletal casing having an interior region configured to confine the internal electronics assembly;
    the foam rubber exoskeletal casing at least in part formed as a multi-layered structure comprising an inside core layer and an outside surface layer, the inside core layer exhibiting higher density properties than those of the outside surface layer to provide differences in stability and tactility; and
    the internal electronics assembly operatively connected to control actuators and including electrical components that cooperate with the control actuators to produce signals for manipulating images or symbols on the display, the control actuators including a mechanism that produces signals in response to motion of a hand of a user gripping the controller to cause corresponding multi-directional positioning of an image or a symbol on the display.

2. The manual controller of claim 1, in which the foam rubber exoskeletal casing covers the control actuators and thereby forms surface actuators that a user indirectly actuates by tactile manipulation of surface regions of the exoskeletal casing covering the control actuators.

3. The manual controller of claim 1, in which the foam rubber exoskeletal casing is formed of upper and lower sections bonded together to form a unitary foam casing.

4. The manual controller of claim 1, in which the outside surface layer of the foam rubber exoskeletal casing is formed of medium-to-high density polyurethane foam.

5. The manual controller of claim 1, in which the foam rubber exoskeletal casing is formed as an integral structure having an opening configured to facilitate insertion of the electronics assembly into the interior region.

6. The manual controller of claim 5, further comprising a foam rubber cover sized to close the opening.

7. The manual controller of claim 1, in which the electronics assembly is encased in hard plastic.

8. The manual controller of claim 1, in which the control actuators include analog stick controls that are operatively connected to the electronics assembly.

9. The manual controller of claim 8, in which the analog stick controls are pre-installed with foam rubber formed to the electronics assembly.

10. The manual controller of claim 8, in which the analog stick controls are mounted on a foam rubber base and configured for installation on the electronics assembly.

11. A damage resistant manual controller for manipulating images or symbols on a display, the controller having an internal electronics assembly, comprising:

a foam rubber exoskeleton having an interior region configured to confine the internal electronics assembly;

the foam rubber exoskeletal casing at least in part formed as a multi-layered structure comprising an inside core layer and an outside surface layer, the inside core layer exhibiting higher density properties than those of the outside surface layer to provide differences in stability and tactility;

the internal electronics assembly operatively connected to control actuators and including electrical components cooperating with the control actuators to produce signals for manipulating images or symbols on the display, the control actuators being positioned for direct or indirect tactile manipulation by a user to cause production of the signals, and the foam rubber exoskeleton covering one or more of the control actuators; and each covered control actuator comprising an actuator assembly that includes a pin and a plate portion on which the foam rubber exoskeleton rests and through which an aperture is located to cause the pin to contact the internal electronics assembly.

12. The manual controller of claim 11, in which the actuator assembly includes a button top portion from which the pin depends, and further comprising a biasing member providing a nominal separation distance between the button top portion and the plate portion in the absence of external contact force applied to the button top portion.

13. The manual controller of claim 12, in which the biasing member includes a spring.

14. The manual controller of claim 11, in which the pin has a top and that fits into a recess in the foam rubber exoskeleton.

15. The manual controller of claim 11, further comprising a analog stick stub extending from the electronics assembly, and in which the pin has a bottom end that forms a matable connection with the analog stick stub.

16. The manual controller of claim 1, in which the electronics assembly includes a flexible printed circuit board supported on a substrate to provide sufficient rigidity to enable operation of the control actuators when manipulated by a user.

17. The manual controller of claim 16, in which the flexible printed circuit board supported on a substrate is divided into multiple separate parts interconnected by communication cabling.

18. The manual controller of claim 1, in which the electronics assembly includes a rigid printed circuit board unsupported by a substrate to enable operation of the control actuators when manipulated by a user.

19. The manual controller of claim 18, in which the rigid printed circuit board is divided into multiple separate parts interconnected by communication cabling.

20. A damage resistant manual controller for manipulating images or symbols on a display, the controller having an internal electronics assembly, comprising:

a foam rubber exoskeleton having an interior region configured to confine the internal electronics assembly;

the foam rubber exoskeletal casing at least in part formed as a multi-layered structure comprising an inside core layer and an outside surface layer, the inside core layer exhibiting higher density properties than those of the outside surface layer to provide differences in stability and tactility;

the internal electronics assembly including an outwardly extending portion having an interior and located for manual contact by the user, the internal electronics assembly operatively connected to control actuators and including electrical components that cooperate with the control actuators to produce signals for manipulating images or symbols on the display, and the control actuators being positioned for direct or indirect tactile manipulation by a user to cause production of the signals; and an elongated member that extends in a direction away from the internal electronics assembly and into the interior of the outwardly extending portion.

21. The manual controller of claim 1, in which the electronics assembly is encased in a housing made of hard material.

22. The manual controller of claim 1, in which the mechanism comprises an analog control responding to manipulation by a user.

23. The manual controller of claim 1, in which the mechanism comprises a set of multiple closely spaced control buttons.

24. The manual controller of claim 1, in which the mechanism comprises a unitary structure of multiple pressable portions.

* * * * *